United States Patent [19]

Diebold et al.

[11] Patent Number: 5,413,227
[45] Date of Patent: May 9, 1995

[54] IMPROVED VORTEX REACTOR SYSTEM

[75] Inventors: James P. Diebold, Lakewood; John W. Scahill, Evergreen, both of Colo.

[73] Assignee: Midwest Research Institute, Kansas City, Mo.

[21] Appl. No.: 956,667

[22] Filed: Oct. 5, 1992

[51] Int. Cl.$^6$ .......................... B04C 7/00; B01D 45/12
[52] U.S. Cl. ................................. 209/722; 209/11; 55/395; 55/459.1
[58] Field of Search ............. 209/11, 20, 138, 139.1, 209/142, 144, 710, 722; 55/395, 398, 459.1; 251/205

[56] References Cited

U.S. PATENT DOCUMENTS

| | | | |
|---|---|---|---|
| 3,945,809 | 3/1976 | Donath | 209/138 X |
| 4,026,679 | 5/1977 | Collin | 209/11 X |
| 4,055,486 | 10/1977 | Choi et al. | 209/144 X |
| 4,077,847 | 3/1978 | Choi et al. | 209/12 X |
| 4,116,823 | 9/1978 | Choi | 209/138 X |
| 4,348,215 | 9/1982 | Dehne | 209/144 X |
| 4,664,139 | 5/1987 | Pfeiffer | 55/459.1 X |
| 4,934,281 | 6/1990 | Engstrom et al. | 251/205 X |

Primary Examiner—D. Glenn Dayoan
Assistant Examiner—Tuan N. Nguyen
Attorney, Agent, or Firm—Edna M. O'Connor

[57] ABSTRACT

An improved vortex reactor system for affecting fast pyrolysis of biomass and Refuse Derived Fuel (RDF) feed materials comprising: a vortex reactor having its axis vertically disposed in relation to a jet of a horizontally disposed steam ejector that impels feed materials from a feeder and solids from a recycle loop along with a motive gas into a top part of said reactor.

11 Claims, 5 Drawing Sheets

IMPROVED VORTEX REACTOR SYSTEM

The United States Government has rights in this invention under Contract No. DE-AC02-83CH10093 between the United States Department of Energy and The National Renewable Energy Laboratory, a division of the Midwest Research Institute.

BACKGROUND OF THE INVENTION

1. Field of the Invention

The present invention relates to an improved vertically oriented vortex reactor system that includes an easily replaced wear plate at the entrance of the vortex reactor to control erosion of the reactor, and a recycle loop that leads into a supersonic jet of an ejector at an acute angle to return solids that minimizes the turbulence loses and maximizes the conservation of kinetic energy of the recycled stream, and removes tramp metals and other nonpyrolyzable debris from the recycle loop through a two 2-way or three-way valve system.

2. Description of the Prior Art

In general, in a vortex reactor system, dried feedstock is fed into a vortex pyrolysis reactor and the feed is ablatively pyrolyzed to maximize the yields of low molecular weight vapors. This is a carefully control led pyrolysis process to minimize thermal cracking of the vapors to light gases and minimize char formation.

The prior art vortex reactor uses a method of heat transfer involving the conduction of heat across a very thin film of pyrolysis oil, and the feed is entrained with carrier gases at very high velocities into the vortex reactor in a tangential direction. This causes the feed to be subjected to very high centrifugal forces, as the feed takes a helical path through the reactor. These centrifugal forces keep the feed particles on or bouncing very close to the externally heated vortex reactor wall, and as the feed slides on the inside surface of the reactor, the surface of the feed is rapidly heated and undergoes extremely rapid pyrolysis. When biomass is heated this rapidly, it undergoes chemical reactions which favor depolymerization or apparent melting, rather than the formation of char. If this melt is pushed aside or otherwise removed as it forms, the pryolsis front can be forced through the feed at rates that are far in excess of those that would be achieved by conventional heating techniques, to the point where the movement of the pyrolysis front could be as high as 3 cm/s.

The explanation for this rapid heat transfer is that it is by conduction across a very thin film of pyrolysis oil (estimated to be as thin as 30 micrometers). Since the wood depolymerizes very rapidly above 450° C., ablative pyrolysis occurs quite rapidly at reactor wall temperatures above this temperature, i.e., at 625° C. In the vortex reactor, it appears that the feed particles slide on a film of lubricating pyrolysis oil on the wall of the reactor. The thickness of the pyrolysis oil film is reduced with an increase in the pressure applied to the particle, which increases the conductive heat transfer across the film and the rate of pyrolysis of the particle. In the vortex reactor, the pressure applied to the particle is created by centrifugal forces pushing the particle onto the wall.

Since the centrifugal forces are proportional to the particle velocity squared, it is very important to have very high entering velocities for the feed particles. However, with high particle velocities, the residence time of the particle in the vortex reactor is very short, and this necessitates recycling of the partially pyrolyzed particles. This is readily done with a tangential exit at the end of the vortex reactor where a supersonic ejector is used to provide the suction to drive the recycle loop and to accelerate the particles to high velocities (subsonic).

In the prior art process; a small amount of char is formed in the vortex reactor. During recycle of the solids in the vortex reactor the char is attrited to a fine powder, which could be used as fuel in the pyrolysis furnace along with the waste gases. The pyrolysis vapors, carrier gas, and finely attrited char leave through an axial exit of the vortex reactor. The fine char is removed from the pyrolysis gases in a hot cyclone separator. The walls of the vortex reactor are heated to 625° C., which results in a temperature of about 500° C. in the exiting process stream.

A circulating fluidized bed reactor comprising a separator including a vortex chamber adjacent the top of the reactor for separating solid material from gases is disclosed in U.S. Pat. No. 4,934,281; however, this patent is essentially two inertial separation devices in series, wherein the solids separation is affected in two concentric cyclonic devices, operating sequentially on a gas stream, and a recirculating fluidized bed supplies the stream of particle laden gases (flowing in a downward direction) to a horizontally oriented vortex tube for separation.

U.S. Pat. No. 4,055,486 discloses apparatus for handling solid fluidized particles in carrying out a pyrolysis process. This process, nevertheless, is a complex system of two cyclonic separators in series to recover solids from a flue gas stream, as part of a dual-fluidized-bed pyrolysis system.

Apparatus for removal of entrained oil from solid particles from a flash pyrolysis is disclosed in U.S. Pat. No. 4,116,825. In this patent, the hot particles are a mixture of low density char and high density sintered or fused ash particles.

A method and apparatus for removing coarse unentrained char particles from the second stage of a two-stage gasifier is disclosed in U.S. Pat. No. 3,945,809. In essence, this patent describes a dual-fluidized bed coal pyrolysis unit, in which oxygen is used to partially oxidize coal char for a heat source.

U.S. Pat. No. 4,664,139 is directed to a slide valve for use with hot, abrasive flows of solids, such as in a fluidized catalytic cracking unit. The valve is specifically designed to exercise variable control of the flow of solids by virtue of a variable orifice area, in which the orifice configuration is a tear-drop shaped hole in a sliding plug of the valve.

None of the foregoing prior art provides means for removing stopped tramp metal and other inert material that has travelled part of the way of the vortex reactor length, due to a combination of low entering velocity and high friction of the inert particles with the wall of the reactor. Moreover, once a first particle stops, it acts as a dam to stop additional particles, and this stoppage causes part of the inside surface of the reactor to be covered with the stopped particles, thereby interfering with the heat transfer to moving particles.

Further, the prior art systems for utilizing a vortex reactor to affect pyrolysis, particularly where, instead of clean biomass, the feeding materials are Refuse Derived Fuel (RDF), there is very rapid erosion rates just opposite the tangential entrance, where some of the particles enter on a short chord, and the erosion pattern is very localized.

Further still, the prior art provides no solutions against returned recycle solids and gases past the colder feeder adaptor, which results in the deposit of condensed pyrolysis oil which slowly forms char that breaks off in large pieces and clogs the feeder adaptor and/or the recycle loop.

Finally, the prior art apparatus for vortex reactor systems, depending upon the feedstock, introduces metal and/or abrasive materials with the feed into the vortex reactor, and these tramp metals do not pyrolyze and they are not easily attrited to fine powders and re-entrained with the gases leaving the axial outlet of the vortex reactor.

SUMMARY OF THE INVENTION

One object of the invention is to provide a vortex reactor system for pyrolysis of biomass and Refuse Derived Fuel that prevents tramp metal and other inert material which normally travels part of the length of the reactor before stoppage due to a combination of low entering velocity and high friction of the inert particles with the wall, to be eliminated by virtue of the innovation of rotating the vortex reactor 90° to a vertical orientation.

Another object of the invention is to provide a means for reducing wear in a vortex reactor system occasioned by very rapid erosion rates just opposite the tangential entrance of the reactor, where some of the particles enter on a short chord and create a localized pattern of erosion.

A still further object of the invention is to provide a vortex reactor system for pyrolysis of biomass and Refuse Derived Fuel having means which would eliminate deposit of condensed pyrolysis oil when returning recycled solids and gases are passed by a colder feeder adaptor and slowly formed char, which would break off in large pieces and clog the feeder adaptor and/or the recycle loop.

A yet further object of the invention is to provide a vortex reactor system for pyrolysis of biomass and Refuse Derived Fuel that removes undesirable solids or tramp metals and returns cleaned gas streams to the recycle loop downstream in a manner such that no change in the pyrolysis system pressures occurs, and to recover these undesirable solids and remove them from the system in order to eliminate rapid destruction of these erosive particles.

In general, the innovative features of the vortex reactor system of the invention include: 1) vertical orientation of the vortex reactor; 2) the use of easily replaced, sacrificial and/or hard surfaced wear plates at the entrance of the vortex reactor to control erosion of the reactor; 3) the return of the solids recycle loop into the supersonic jet of the ejector at an acute angle to minimize the turbulence losses and to maximize the conservation of kinetic energy of the recycle stream; and 4) the removal of tramp metals and other nonpyrolyzable debris from the recycle loop by the use of a two 2-way valve or a 3-way valve.

BRIEF DESCRIPTION OF THE DRAWINGS

The accompanying drawings which are incorporated in and form a part of the specification will illustrate preferred embodiments of the invention, and together with the description, serve to explain the principals of the invention. In the drawings:

FIGS. 2A(1)-2E illustrates the key features of the novel design wear plates which permit easy disassembly and replacement of an area just opposite the tangential entrance of the vortex reactor;

DETAILED DESCRIPTION OF THE INVENTION

Figure 1:
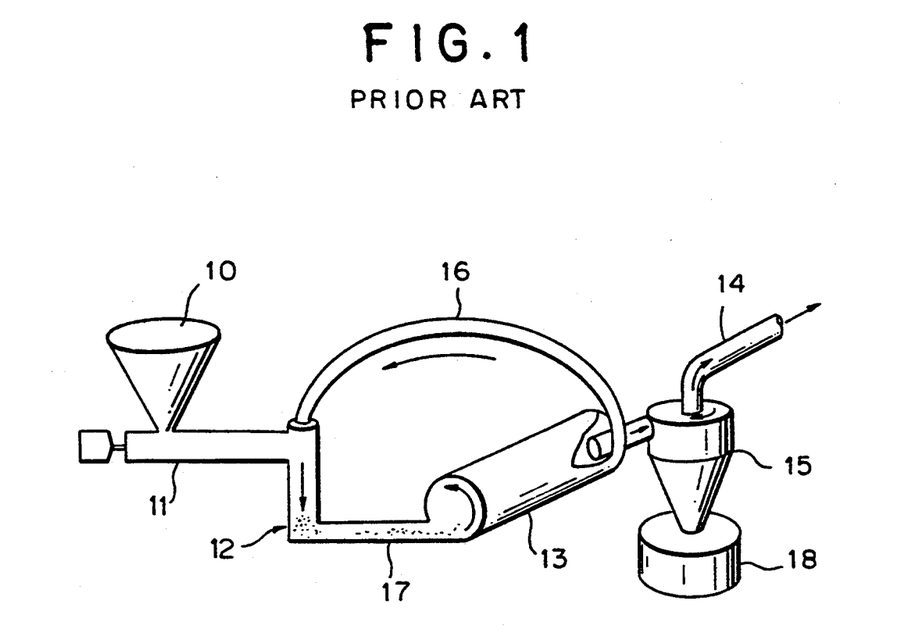
FIG. 1 is a schematic illustration of a typical prior art vortex reactor system.

In the course of studying the problems associated with pyrolysis of biomass feeds and feeding materials such as Refuse Derived Fuel (RDF), utilizing a vortex reactor system of the prior art, the limitations of a typical prior art vortex reactor system such as that depicted in FIG. 1 will provide a large number of insights.

For example, in FIG. 1, biomass chips 10 are fed into a screw feeder 11, and the feed is entrained with carrier gases such as steam (indicated by arrow 12) at temperatures between about 400° to 750° C. at very high velocities into the vortex reactor in a tangential direction. This causes the feed to be subjected to very high centrifugal forces, inasmuch as the feed travels a helical path through vortex reactor 13, and these centrifugal forces maintain the feed particles on or very near to the externally heated vortex reactor wall which is heated to temperatures of about 625° C. The method of supplying heat to the vortex reactor is known in the literature[1], and this literature is incorporated by reference in its entirety.

[1] J. P. Diebold et al., "Engineering Aspects of the Vortex Reactor to Produce Primary Pyrolysis Oil Vapors for Use in Resins and Adhesives" in Research in Thermochemical Biomass Conversion, A. V. Bridgwater and J. Kuester, eds., Elsevier Applied Science, NY (1988), pp. 609-628.

As the feed slides on the interior surface of the reactor, the feed surface is rapidly heated and undergoes extremely rapid pyrolysis, and when the biomass feed is heated this rapidly, it undergoes chemical reactions which favor depolymerization or melting, rather than the formation of char. If the melt is pushed aside or removed by other means as it forms, the pyrolysis front may be forced through the feed at rates that are far in excess of those that would be achieved by conventional heating techniques. While not wishing to be bound by a theory of how this process is accomplished, it is nevertheless believed that this rapid heat transfer is by conduction across a very thin film (as thin as 30 micrometers) of pyrolysis oil, and since the wood depolymerizes very rapidly above 450° C., ablative pyrolysis vapors 14 are produced very rapidly at the reactor wall temperatures (625° C.) and are exited from an outlet at the top portion of a hot char cyclone 15. The movement of the pyrolysis front may be as high as 3 cm/s, and, in the vortex reactor, the feed particles slide on a film of lubricating pyrolysis oil on the wall of the reactor. The thickness of the pyrolysis oil film is reduced with an increase in the pressure applied to the particles, which increases the conductive heat transfer across the film and the rate of pyrolysis of the particles. The pressure applied to the particles is created by centrifugal forces pushing the particle onto the interior wall of the vortex reactor, and since the centrifugal forces are proportional to the particle velocity squared, it is important to have very high entering velocities for the feed particles; however, with high particle velocities, the residence time of the particles in the vortex reactor tends to be very short, and this necessitates recycling of solids or partially pyrolyzed particles through recycle loop 16 through the use of a tangential exit contiguous with the recycle loop at the end of the vortex reactor. A supersonic steam ejector (not shown) indicated by 17 that operates at temperatures of about 525° C. provide the suction to drive the recycle loop and to accelerate the particles to high subsonic velocities. The temperature of the solids exiting tangentially prior to entering the recycle loop are about 500° C. and the temperature of the solids exiting from the recycle loop and entering the distal end of the screw feeder is about 400° C. At the bottom of the hot char cyclone is a char receiver 18 which receives char particles in the size range of about −50 μm char.

In the prior art vortex reactor system, tramp metal and other inert material tends to travel part of the length of the reactor, whereupon it comes to a stop, due to a combination of low entering velocity and high friction of the inert particles with the interior wall of the vortex reactor. This stoppage is unexpected, in view of the fact that gas velocities passing over the particles are moving at speeds of several hundred miles per hour; nevertheless, the stopped particles are well inside the boundary layer of stagnant gases near the interior wall of the reactor, and once the first particle stops, it acts as a dam and proceeds to stop additional particles, thereby causing part of the inside surface of the reactor to be covered with the stopped particles (particularly in the lower quadrant), and interferes with or interrupts the heat transfer to the moving particles. It appears that the boundary layer of stagnant gases near the wall moves inward to keep the stopped particles protected as they accumulated.

The present invention solution to this problem of accumulation is accomplished by rotating the vortex reactor 90° to a vertical orientation. This vertical orientation proved effective in eliminating the aforementioned stoppage problems, by making the slow moving particles drop to the bottom of the vortex reactor where they could be re-entrained, and whereupon the tramp material is removed from the vortex reactor system by either a two 2-way valve or a 3-way valve hereinafter to be described.

In the prior art vortex reactor system, erosion of the wear plate where either biomass feed or feeding materials such as Refuse Derived Fuel occurs just opposite of the tangential entrance where some of the particles enter on a short cord into the vortex reactor. This erosion occurs at a very rapid rate, and the erosion pattern is in a very localized area.

In order to contend with this rapid erosion rate in this very localized area just opposite the tangential entrance where the particles enter the vortex reactor, we have placed a small, replaceable wear plate in the vortex reactor to provide successful reduction of wear. This discovery permits the wear plate to be much smaller than would otherwise be expected, and the relatively small size of the wear plate of the invention when compared to wear plates normally made of expensive, specially hardened surface materials, constitute a definite advantage.

Figure 2A:
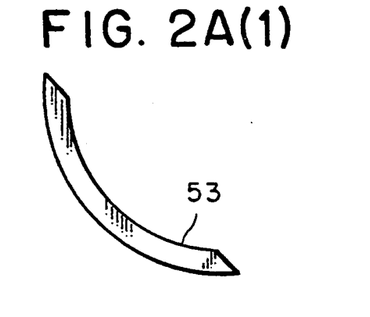
Figure 2B:
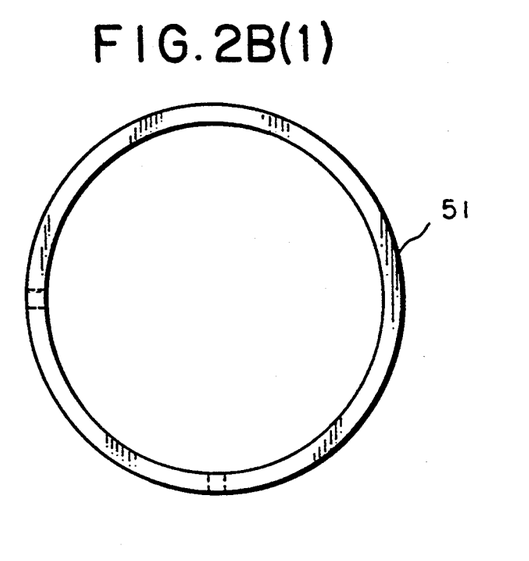
Figure 2C:
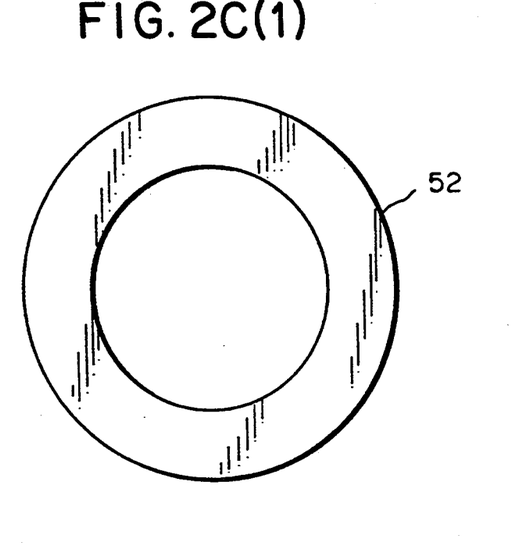

The novel design of the wear plate for the vortex reactor permits easy disassembly and replacement of the wear plate as needed, by the use of hand tools only. The key features of the design of the wear plate are shown in FIGS. 2A(1)–2E which in essence consist of: a conventional pipe flange., the removal of which permits easy access to the wear plate assembly; a wear ring spacer, which enables proper positioning of the wear plate and the wear ring longitudinally; the wear ring, which is a removable, sacrificial part; a wear plate, which is a quarter-circle piece of pipe that slips into a novel, curved dovetail slot that properly positions the wear plate relative to the tangential entry of the vortex reactor; and the dovetail slot itself made by removing a 90° section of the reactor wall and covering the hole from the removed section with a larger, telescoping pipe. By utilizing the foregoing novel design of wear plate for the reactor, the need for cutting and welding is obviated, and this is at variance with the replacement of the prior art wear plate concepts. In this connection, it should be appreciated that the design of the replaceable wear plate assembly is suitable for use with cyclone separators and cyclonic reactors, which are known to experience severe erosion in this area.

FIGS. 2A(1)–2A(2) show the wear plate, which is a quarter-circle piece of pipe shown in front and side views, and which slips into a novel, curved dovetail slot that positions the wear plate relative to the tangential entry of the vortex reactor.

FIGS. 2B(1)–2B(2) shows front and side views of the wear ring spacer that positions the wear plate and the wear ring longitudinally, and the wear ring spacer design contains drill holes DR.

FIGS. 2C(1)–2C(2) show side and front views of the wear ring WR which is a removable, sacrificial part.

Figure 2D:
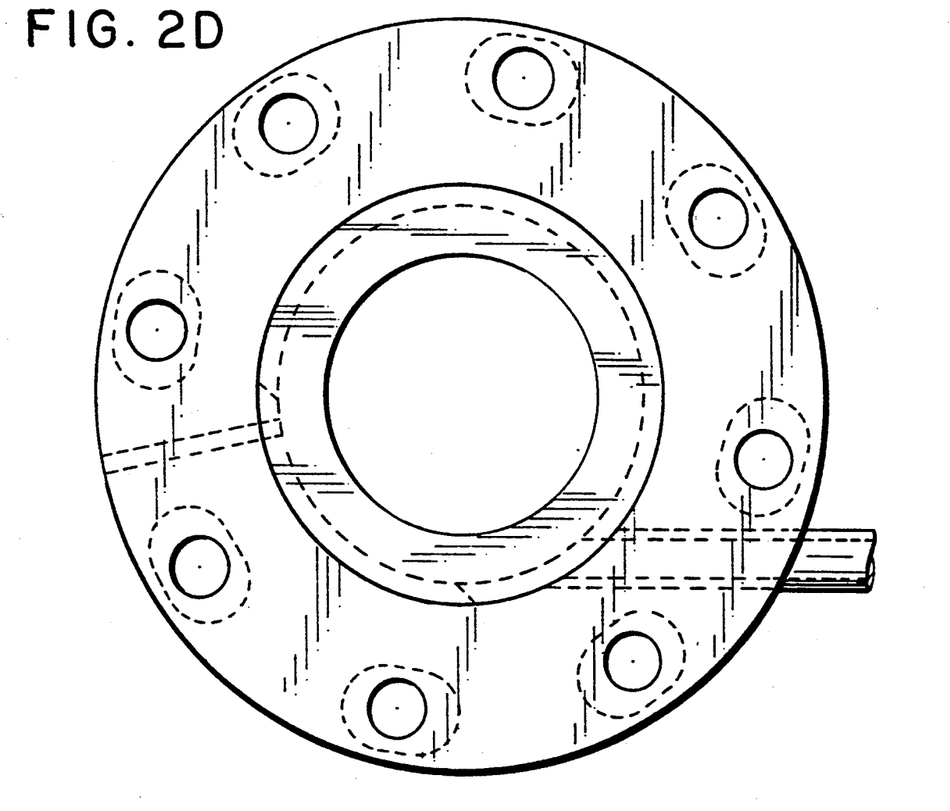

FIG. 2D shows a cross-sectional view of a top portion of a vortex reactor in which the wear plate slot made by removing the appropriate slice for the quarter-circle piece of pipe of wear plate that slips into the curved dovetail slot just opposite the tangential entrance of the vortex reactor of the invention.

Figure 2E:
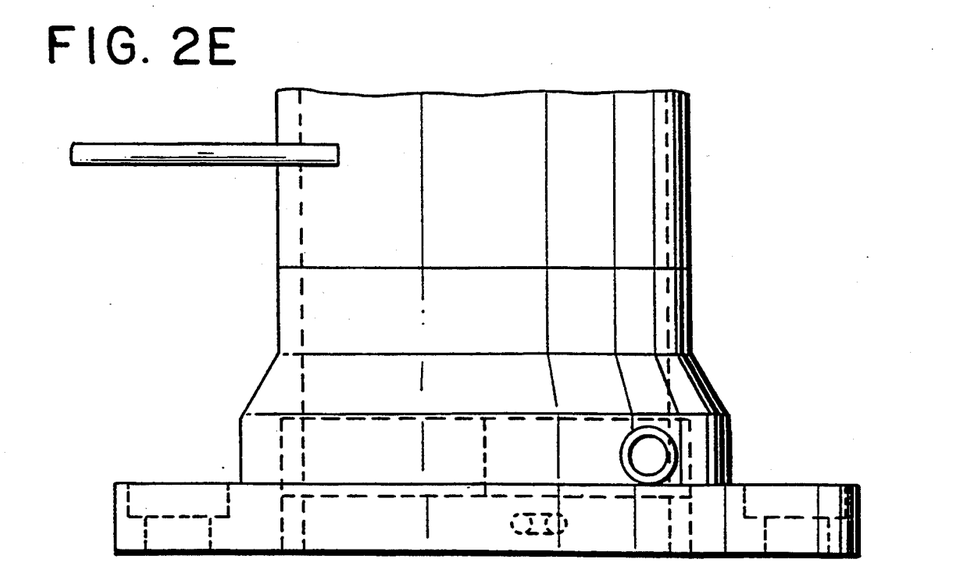

FIG. 2E shows a side view of a telescoping pipe used to cover the dovetail slot made by removing a 90° section of the reactor wall.

Figure 5:
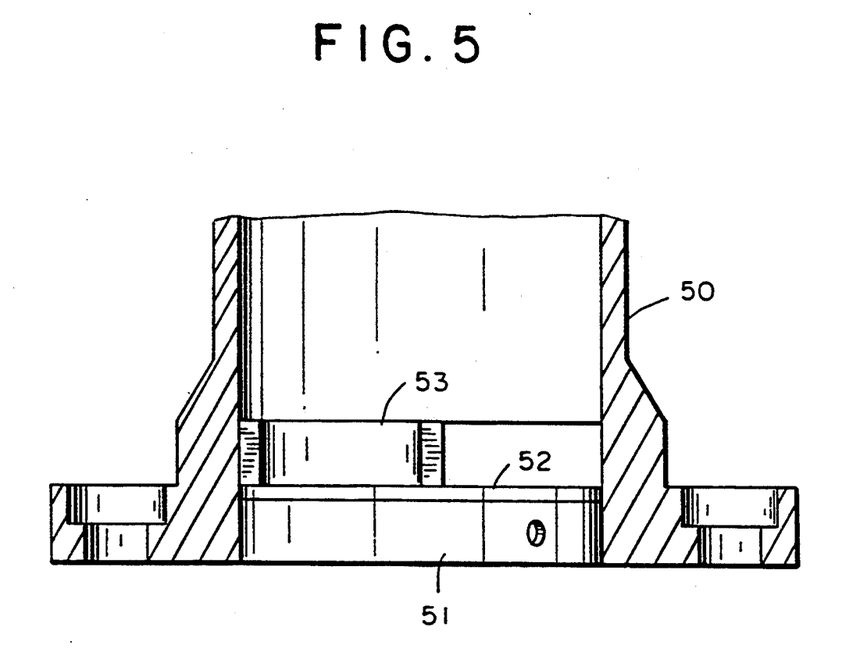
FIG. 5 is a sectional view showing how the wear plate, wear ring and spacer are structurally put together within the telescoping pipe which covers the dovetail slot made by removing a 90° section of the reactor wall.

FIG. 5 shows the kinetic energy saving ejector design of the vertically oriented vortex reactor system of the invention that is used to prevent deposit of condensed pyrolysis oil upon returning the recycled solids and gases past the colder feeder adaptor.

Figure 4:
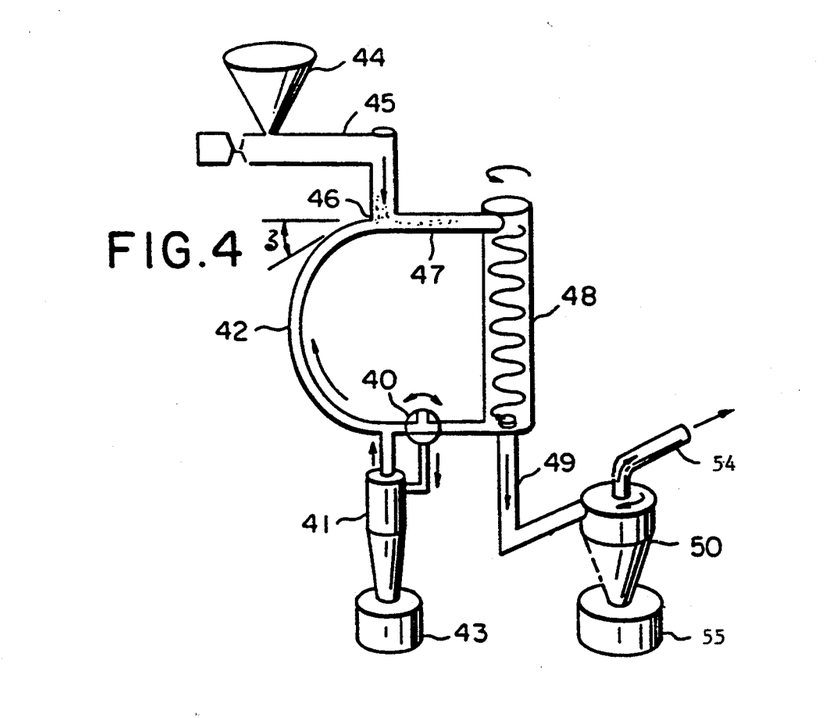
FIG. 4 illustrates the vortex reactor system of the invention utilizing the 3-way valve to remove inerts from the recycle loop.

FIG. 4 shows the kinetic energy saving ejector design of the vertically oriented vortex reactor system of the invention, with the inclusion of a 3-way valve rotated 90° to permit the recycle stream to be diverted to flow through an inert cyclone separator.

In FIG. 5, biomass chips 50 are fed into a screw feeder 31, whereupon a motive or carrier gas 32 at temperatures of about 525° C. carry the particles into the entrance of a vertically oriented vortex reactor 33, and wherein the vortex reactor wall is heated at a temperature of about 625° C. By routing the recycled solids and gases directly to a steam ejector 54, the deposition in the feeder adaptor and resultant plugging of the system was eliminated. Through the us of this novel vortex reactor kinetic energy conserving ejector design system, there are two, rather than the customary or prior art one, long pressure streams entering the ejector, i.e., the feedstreams and the recycled solids stream.

The feedstream only has the velocity created by falling a short distance, and it is relatively unimportant at what angle it meets the supersonic jet of the steam ejector. Therefore, the feeding portion of the novel ejector is that of a conventional ejector for the entrainment of solids with a carrier gas, i.e., the feed enters the ejector at 90° to the supersonic jet.

Figure 3:
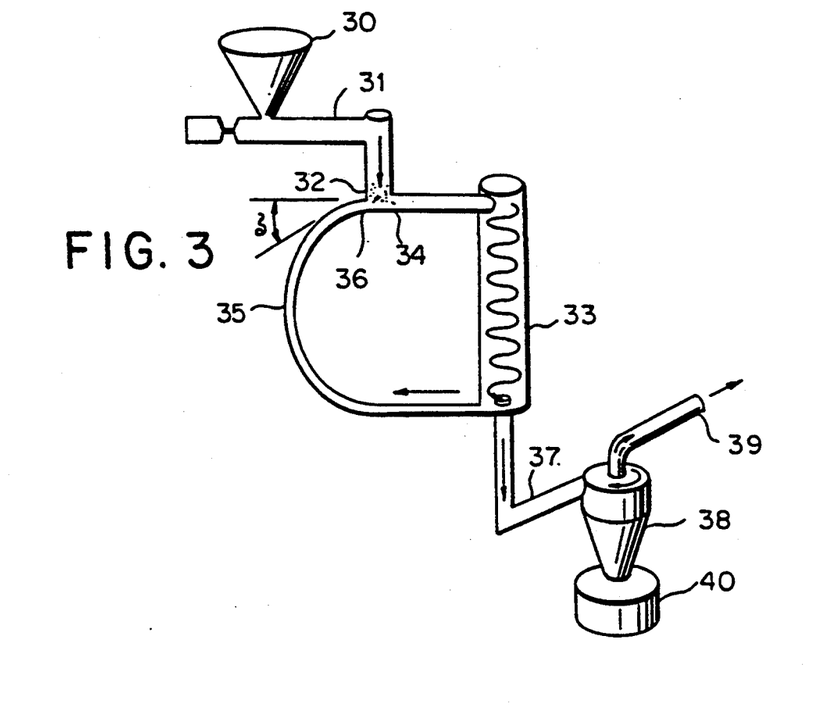
FIG. 3 illustrates the kinetic energy conserving ejector design of the vortex reactor system of the invention.

In this connection, it should be appreciated that there is a considerable amount of kinetic energy in the solids recycle loop 35, as it travels at a typical speed of about 100 m/s (200 mph). Accordingly, it is important to the efficiency of the operation of the vortex reactor system to conserve this kinetic energy. In further regard to FIG. 3, it should be noted that, in the method of the invention, the high-speed recycle loop enters the ejector between the motive-gas nozzle and the venturi throat 36 at an acute angle $\zeta$ (zeta), which is about 30° or less and in same general direction as the high velocity motive gas. In this manner, the amount of change in direction of the recycle loop is minimized within the ejector, with a minimal amount of particles impacting the walls of the ejector at large angles. By reducing the angle of the recycle loop with the supersonic jet, the particles that are not completely turned by the jet tend to ricochet off of the wall, rather than transferring their kinetic energy to the wall by impact. This minimizes the transfer of energy from the recycle stream to the walls of the ejector and also reduces the tendency for the ejector to become eroded from the impact of high velocity particles. The temperature of the exit connection 37 between the vortex reactor and the hot clear cyclone 38 is about 500° C. and the exiting pyrolyzing vapors 39 are at a temperature of about 450° C. As in the case of the prior art, the char receiver 40 receives char particles of a size of about $-50$ $\mu$m char.

Depending upon the nature of the feedstock, metal and/or abrasive materials can be introduced along with the feed into the vortex reactor; however, these tramp materials do not pyrolyze and they are not easily attrited to fine powders and re-entrained with the gases leaving the axial outlet of the vortex reactor. In this connection, it should be noted that most 3-way valves for use in connection with process streams are constructed to force the process stream to turn 90° either to the right or to the left; however, this conventional arrangement would not work in the context of the present invention, inasmuch as it would result in very rapid destruction of such a 3-way valve, due to the continued sharp turn of the erosive particles involved.

The invention construction utilizes an unusual 3-way valve in a manner such that it allows the free-unrestricted flow of gases and solids in the recycle loop to pass straight through. When it is desired to remove tramp metals and other non-pyrolyzable material from the reactor, the biomass feed is temporarily discontinued for a few seconds to permit biomass already in the reactor system to be completely pyrolyzed. At this point, the only solids being recirculated in the reactor system are the tramp metals and other inert materials. Reference is now made to the embodiment depicted in FIG. 4, where a special 3-way valve 40 is rotated 9° to permit the recycle stream to be diverted to flow through a special inert cyclone separator 41 to remove the undesirable solids and return the cleaned gas stream to the recycle loop 42 downstream of the 3-way valve to result in virtually no change in the pyrolysis system pressures. The recovered solids are accumulated in and are removed from a receiver vessel 43 attached to the bottom of the special cyclone separator. After this very brief period of removal of the tramp materials, the valve is returned to the straight-through position and biomass chips 44 are returned to screw feeder 45 where a motive gas 46 such as steam impels the feed materials through a steam ejector 47 at temperatures in the vicinity of about 525° C. As the feed materials enter the vortex reactor 48 through a tangential opening from a connecting outlet CO, as is best shown in FIG. 2D, and impinge on an area just opposite the tangential entrance, the replaceable wear plate RWP disposed at this location enables successful reduction of wear in the vortex reactor. As mentioned, the vortex reactor wall is heated to about 625° C. and the exiting connector 49 between the vertically disposed vortex reactor and the hot char cyclone 50 has a temperature of around 500° C., and this results in pyrolysis vapors 54 having temperatures about 450° C. exiting from the outlet of the hot char cyclone. The char receiver 55 disposed at the base of the hot char cyclone collects char particles of sizes in the vicinity of about $-50$ $\mu$m. Again, as in the embodiment shown in FIG. 3, the solids recycle loop enters tee ejector between the motive-gas nozzle and the venturi throat at an acute angle $\zeta$ (zeta) and in the same general direction as the high velocity motive gases.

In the context of the improved vortex reactor system of the invention, the removal of tramp metals and other debris has been demonstrated utilizing a custom-made 3-way plug valve as shown in the embodiment of FIG. 4; however, it is also contemplated within the ambit of the invention to utilize several equally applicable and obvious variations of this inventive concept in order to remove tramp metals and other debris. For example, a separate tangential exit located in the vortex reactor for dumping out the tramp material would work equally as well. Similarly, an aerodynamic valve on the recycle loop or two 2-way valves may be located in the recycle loop. In the case of utilizing two 2-way valves, one of the 2-way valves would be located so that it would open and close the recycle loop and the other 2-way valve would be attached to the recycle loop at right angles. In order to dump material out of the recycle loop, the right angle attachment or side valve would be opened, and the in-line valve would be closed. It is obvious that this two 2-way valve arrangement would function equivalently to a 3-way valve.

The method for removing tramp material of the invention may also be accomplished by the use of a cyclonic separator to separate the tramp solids from the gases, with return of the gases to the recycle loop, as discussed in the 3-way valve system.

What is claimed is:

1. An improved vortex reactor system for affecting fast pyrolysis of biomass and Refuse Derived Fuel (RDF) feed materials comprising:

a vortex reactor having its axis vertically disposed in relation to a jet of a horizontally disposed stream ejector that impels feed material from a feeder and solids from a recycle loop along with a motive gas into a top part of said reactor;

wherein said top part of said vertically disposed vortex reactor has a wear plate assembly comprising: a removable pipe flange which has been replaced by said wear plate assembly, said wear plate assembly comprising a wear plate of a sectional circular piece of pipe that fits into a curved dovetail slot that positions said wear plate opposite a feed tangential entry position of the top part of said vortex reactor, a wear ring spacer that positions said wear plate and a wear ring longitudinally, and a removable wear ring; said dovetail slot being made by removal of an approximately 90° section of a reactor wall of said vortex reactor and converting said approximately 90° section with a larger telescoping pipe.

2. A vortex reactor system of claim 1, wherein said replaceable wear plate is selected from the group consisting of stainless steel, ceramic coated stainless steel or a ceramic material.

3. A vortex reactor system of claim 2, wherein said ceramic material is selected from the group consisting of alumina or silicon nitride.

4. A vortex reactor system according to claims 1 or 2 or 3, wherein said recycle loop connects a bottom portion of said vortex reactor and an outlet of a screw feeder to enable partially pyrolyzed material to be re-entrained and recycled into said vortex reactor.

5. A vortex reactor system of claim 4, wherein said recycle loop does not entrain fresh feed into the ejector, but enters directly into the ejector between a motive-gas nozzle and a venturi throat, and wherein entry of the recycle loop into the ejector is at an acute angle and in a direction of motive gas flow.

6. A vortex reactor system of claim 5, wherein said recycle loop for solids enters said ejector at an acute angle of 30° or less.

7. A vortex reactor system of claim 6, in which said recycle loop is fitted with a valving system to remove entrained tramp metal and other non-frangible solid inert materials from the recycle loop.

8. A vortex reactor system of claim 7, wherein said valving system comprises two 2-way valves to close said recycle loop and to open a pipe to shunt entrained, non-frangible solid inert materials from the recycle loop.

9. A vortex reactor system of claim 7, wherein said valving system is a 3-way plug or ball valve having a straight-through flow pattern, which is rotatable to shunt entrained, non-pyrolyzable materials from the vortex reactor system.

10. A vortex reactor system of claim 8, in which a 2-way valve is designed to open a tangential exit on the vortex reactor to remove the tramp material.

11. A vortex reactor system of claims 8 or 9 or 10 wherein shunted, entrained solids are passable over a cyclone separator fixed in said system to remove solids from an entraining gas stream and affect return of cleaned gases to said recycle loop downstream of said valving.

* * * * *